United States Patent [19]

Morgan

[11] 4,455,731
[45] Jun. 26, 1984

[54] FILTRATION BAG REMOVER

[76] Inventor: Howard W. Morgan, P.O. Box 735, Michigan City, Ind. 46360

[21] Appl. No.: 351,776

[22] Filed: Feb. 24, 1982

[51] Int. Cl.³ ............................................. B23K 37/04
[52] U.S. Cl. .................................... 29/280; 269/48.1; 294/93
[58] Field of Search .................................. 294/93-95; 29/278, 280; 279/2 R, 33; 242/72 R; 269/48.1

[56] References Cited

U.S. PATENT DOCUMENTS

| | | | |
|---|---|---|---|
| Re. 24,626 | 4/1959 | Williams | 29/280 |
| 540,649 | 6/1895 | Eastwood | 242/72 R |
| 678,416 | 7/1901 | Metcalfe et al. | 294/93 |
| 3,401,973 | 9/1968 | Marshall | 294/93 |
| 4,057,889 | 11/1977 | Ferguson | 29/280 |
| 4,177,914 | 12/1979 | Clavin | 269/48.1 |

Primary Examiner—Robert C. Watson
Attorney, Agent, or Firm—James D. Hall

[57] ABSTRACT

A device for removing liquid filter bags from a filter housing. The device includes retractable arms which engage the upper part of the bag and allow for easy removal by a simple pulling on the device.

3 Claims, 6 Drawing Figures

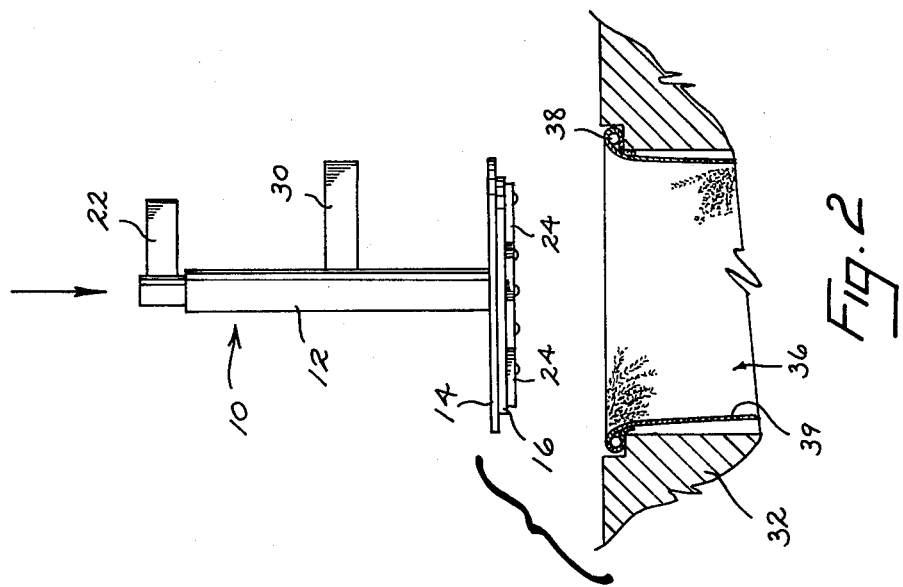
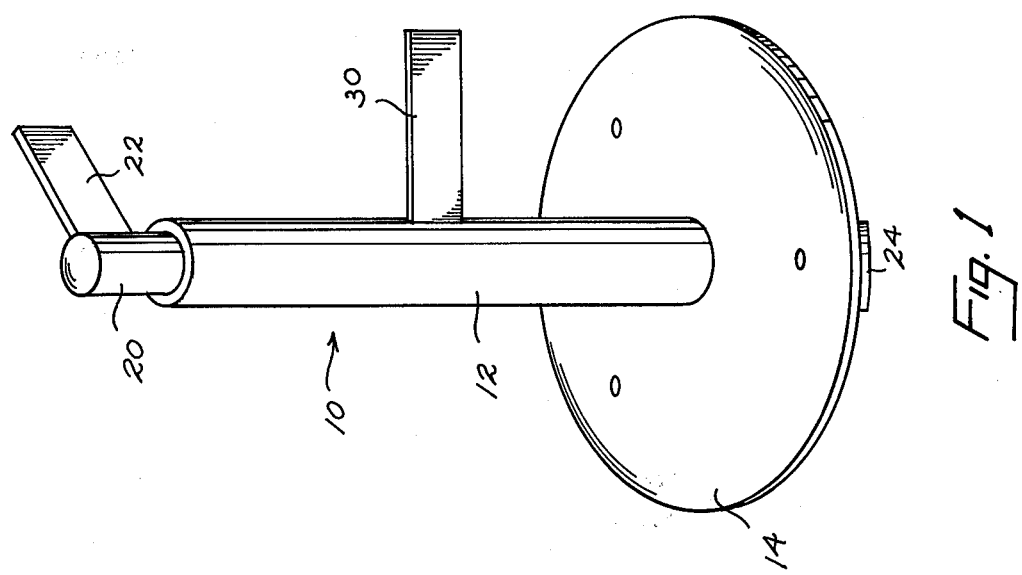

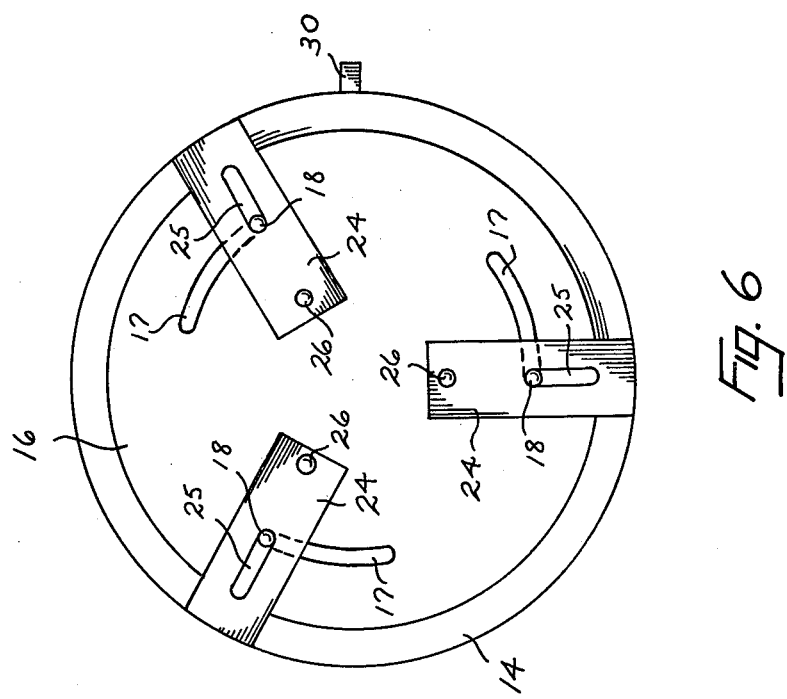
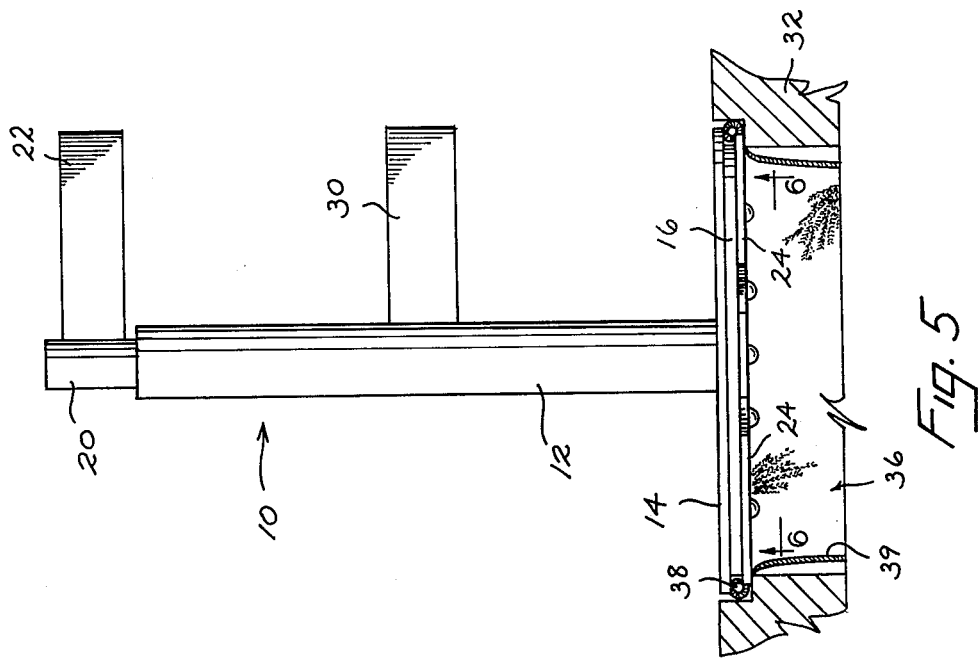

FILTRATION BAG REMOVER

SUMMARY OF THE INVENTION

This invention relates to a bag remover and will have specific application to the removal of filter bags from a liquid filter.

Filter bags made of a fibrous material have been found to be excellent fluid strainers and are widely used in the filter industry. The major problem with using bags is that when the bag accumulates a great deal of sediment over a period of time, it tends to cling to the supporting reticulated basket it rests in, making removal of the bag difficult. Difficulty in removal can also occur when a negative pressure inside the housing is present due to clogged bags. The remover device of this invention serves to rectify the problem of bag removal. By inserting the device into a filter housing opening and rotating an upright shaft, arm members engage the bag, allowing it to be removed easily and quickly by a simple pulling up on the device.

Accordingly, it is an object of this invention to provide a device for removing filter bags from a filter.

Another object of this invention is to provide a method of removing spent filter bags from a filter basket which is both efficient and economical.

Other objects of this invention will become apparent upon a reading of the following description.

BRIEF DESCRIPTION OF THE DRAWINGS

A preferred embodiment has been chosen to best describe the principles of this invention wherein:

FIG. 1 is a perspective view of the bag remover.

FIG. 2 is a fragmentary sectional view of a filter with a bag in place, and the remover ready for insertion.

FIG. 5 is a fragmentary sectional view of a filter with the remover inserted and the arms thereof in their extended position.

FIG. 6 is a bottom view of the remover as seen generally from line 6—6 of FIG. 5.

DESCRIPTION OF THE PREFERRED EMBODIMENT

Figure 4:
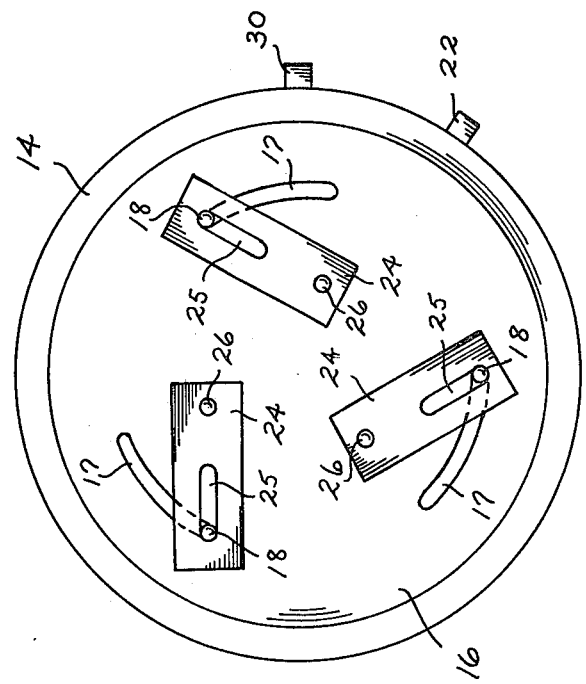
FIG. 4 is a bottom view of the remover as seen generally from line 4—4 of FIG. 3.

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

Bag remover 10 consists of tubular member 12 connected at one end to a locater plate 14. An actuator disc 16 is located below plate 14 and is attached to one end of a shaft member 20 which extends through tubular member 12. Shaft member 20 protrudes from the opposite end of tubular member 12 where it is attached to a handle 22, for ease of rotating the shaft member. Actuator disc 16 is located against plate 14 and is connected to shaft 20 so as to be rotatable relative to plate 14 upon turning of the shaft within tubular member 12. A handle 30 is connected to tubular member 12.

A plurality of arms 24 are carried by disc 16. The innermost end of each arm 24 is pivotally connected to disc 16 by a screw 26 which is threaded into the disc. Arms 24 are of equal length and are pivotally connected to disc 16 equal angularly from each other, an equal radial distance from the pivot axis of shaft 20. Disc 16 has, for each arm 24, an arcuate slot 17 formed through it along a radial section. Each arm 24 includes a longitudinal slot 25 which extends from its outer end and which crosses or overlies slot 17 in disc 16. A screw 18 extends through each aligned arm slot 25 and disc slot 17 and is threaded into plate 14.

Figure 3:
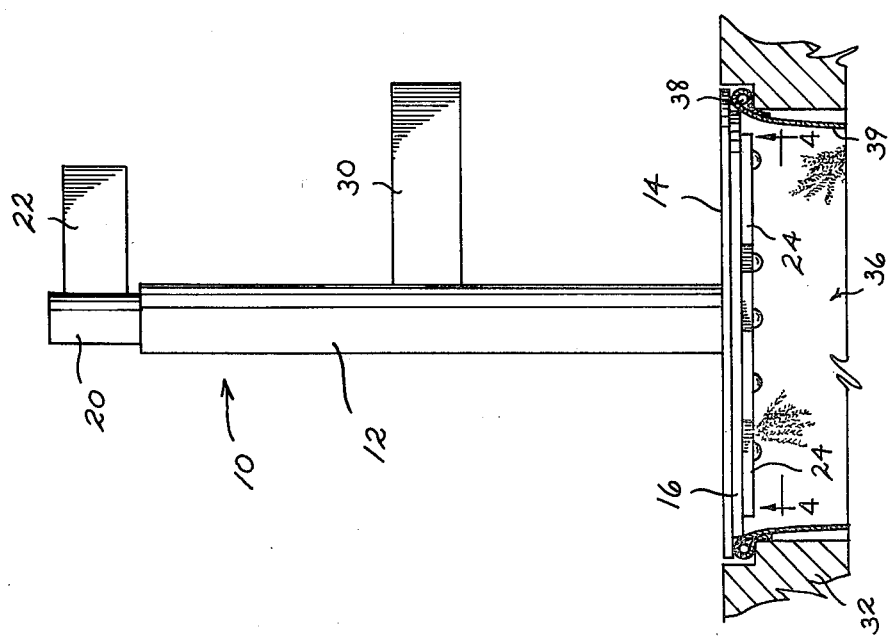
FIG. 3 is a fragmentary sectional view of a filter with the remover inserted and the arms thereof in their retracted position.

To operate remover 10, a worker grasps handle 30 and inserts the remover into the filter housing 32. Plate 14 is sized so as to fit within the opening of the filter housing, coming to rest upon the filter bag 36 at its generally rigid ring 38 to which the flexible bag material 39 is connected. Handle 22 is then turned which causes shaft 20 and disc 16 to rotate relative to plate 14. Arms 24 shift radially to rotate relative to plate 14. Arms 24 shift radially from the retracted position shown in FIGS. 3 and 4 into the extended position shown in FIGS. 5 and 6. Such movement is accommodated by sliding movement of screws 18 within slots 17 and 25.

When extended, arms 24 contact filter bag 36 at ring 38 to clamp the ring, such as shown in FIG. 5. To remove bag 36, the operator simply pulls on tubular member 12 while maintaining a grip on handles 22 and 30, pulling the bag out of housing 32. When bag 36 is removed, handle 22 is then turned back to its original position, causing arms 24 to be retracted and the release of bag 36.

It is to be understood that this invention is not to be limited to the preceding description, but may be modified within the scope of the appended claims.

What I claim is:

1. A device for removing a filter bag from a filter housing, said housing having an opening for receiving said bag, said bag supported within said housing opening and including a shape-retaining margin defining the opening into the bag, said device comprising a tubular member having a plate connected at one side face to one end of the tubular member, a shaft part extending through said tubular member and plate, an actuator disc having one side face located next to the opposite side face of said plate, said shaft part connected to said disc wherein rotation of the shaft part within said tubular member causes rotation of the disc relative to said plate, an arm pivotally connected at one end to the opposite side face of said disc adjacent the rotational center of the disc, means pivotally anchoring said arm at a location spaced from its pivotally connected one end to said disc and plate for radial movement relative to said disc rotational center between retracted and extended positions upon said shaft rotation, whereby said device is inserted into said housing opening with said arm in its retracted position and its plate at said bag margin, said shaft there being rotatable to shift said arm into its extended position engaging said bag margin to secure the bag to said device for pulling removal.

2. The device of claim 1 wherein said arm anchoring means includes a longitudinally directed slot in said arm and a transversely directed slot in said disc, a pivot pin extending through said arm and disc slots connected in said plate, said slots constituting means for allowing said arm to shift between its retracted and extended positions relative to said disc and said pivot pin.

3. The device of claim 2 and at least a second arm pivotally connected and anchored to said disc and plate as said first mentioned arm so as to be shiftable between retracted and extended positions upon shaft rotation to engage said bag margin.

* * * * *